(12) United States Patent
Nose et al.

(10) Patent No.: US 11,767,802 B2
(45) Date of Patent: Sep. 26, 2023

(54) CONTROL DEVICE FOR VEHICLE

(71) Applicant: TOYOTA JIDOSHA KABUSHIKI KAISHA, Aichi-ken (JP)

(72) Inventors: Yuki Nose, Nagoya (JP); Yuto Ikeda, Okazaki (JP); Yasuyuki Takama, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 17/932,672

(22) Filed: Sep. 16, 2022

(65) Prior Publication Data

US 2023/0119192 A1 Apr. 20, 2023

(30) Foreign Application Priority Data

Oct. 14, 2021 (JP) .................. 2021-168798

(51) Int. Cl.
*F01N 9/00* (2006.01)
*F02D 41/02* (2006.01)

(52) U.S. Cl.
CPC .......... *F02D 41/029* (2013.01); *F01N 9/002* (2013.01); *F01N 2560/05* (2013.01); *F02D 2200/0802* (2013.01); *F02D 2200/0812* (2013.01)

(58) Field of Classification Search
CPC .......... F02D 41/029; F02D 2200/0802; F02D 2200/0812; F01N 9/002; F01N 2560/05
See application file for complete search history.

(56) References Cited

U.S. PATENT DOCUMENTS

| | | | | |
|---|---|---|---|---|
| 5,275,249 A | * | 1/1994 | Nelson | B62D 25/12 180/69.2 |
| 8,146,349 B2 | * | 4/2012 | Bloms | F01N 3/025 60/297 |
| 2009/0235647 A1 | * | 9/2009 | Ikeda | F01N 3/023 60/297 |
| 2012/0102919 A1 | * | 5/2012 | Smith | F01P 7/04 60/287 |
| 2012/0227378 A1 | * | 9/2012 | Koestler | F01N 3/023 60/274 |
| 2013/0074481 A1 | * | 3/2013 | Miura | F01N 9/002 60/311 |
| 2013/0103265 A1 | * | 4/2013 | Remy | B60K 11/085 701/49 |
| 2014/0039765 A1 | * | 2/2014 | Charnesky | B60K 11/085 701/49 |
| 2016/0368365 A1 | * | 12/2016 | Jackson | B60K 1/00 |
| 2023/0023550 A1 | * | 1/2023 | Robinson | G06F 3/14 |

FOREIGN PATENT DOCUMENTS

JP 2008196394 A 8/2008

* cited by examiner

*Primary Examiner* — Matthew T Largi
(74) *Attorney, Agent, or Firm* — HAUPTMAN HAM, LLP

(57) ABSTRACT

A CPU prompts a user to drive a vehicle to a repair shop by operating a display when an amount of PM deposited in a GPF increases. When a regeneration request for the GPF is input from a shop-side terminal in the repair shop, the CPU performs a regeneration process in a state in which the vehicle stops. The CPU controls a temperature of the GPF such that the temperature at the time of execution of the regeneration process becomes lower when an opening/closing member is in a closed state than when the opening/closing member is in an open state.

11 Claims, 7 Drawing Sheets

CONTROL DEVICE FOR VEHICLE

CROSS-REFERENCE TO RELATED APPLICATION

This application claims priority to Japanese Patent Application No. 2021-168798 filed on Oct. 14, 2021, incorporated herein by reference in its entirety.

BACKGROUND

1. Technical Field

The disclosure relates to a control device for a vehicle.

2. Description of Related Art

For example, Japanese Unexamined Patent Application Publication No. 2008-196394 (JP 2008-196394 A) discloses an internal combustion engine in which an exhaust emission controller that collects particulate matter in exhaust gas is provided in an exhaust gas passage. In JP 2008-196394 A, it is described that a regeneration process of removing particulate matter is performed by increasing a temperature of the exhaust emission controller when a vehicle in which the internal combustion engine is mounted stops.

SUMMARY

In a stopped state, an amount of discharged heat which is generated when the exhaust emission controller is heated is less than when the vehicle is traveling. Accordingly, there is concern about the temperature of the exhaust emission controller or components of an exhaust system connected to the exhaust emission controller exceeding an allowable range. On the other hand, it is conceived that the regeneration process be performed while switching an opening/closing member for opening/closing an upper opening of an accommodation compartment in which the internal combustion engine is accommodated to an open state. Accordingly, the amount of discharged heat can be increased in comparison with a case in which the regeneration process is performed while switching the opening/closing member to a closed state. As a result, it is possible to curb an excessive increase of the temperature of the exhaust emission controller or components of an exhaust system connected to the exhaust emission controller. However, it cannot be guaranteed that the opening/closing member will be able to be brought into the open state at the time of performing the regeneration process due to rainy weather or the like.

The disclosure provides the following configurations.

1. According to an aspect of the disclosure, there is provided a control device for a vehicle including an internal combustion engine and a sensor that detects an open/closed state of an opening/closing member for opening/closing an opening of an accommodation compartment in which the internal combustion engine is accommodated, wherein the internal combustion engine includes an exhaust emission controller configured to clean exhaust gas, and wherein the control device is configured to perform: an opening/closing information acquiring process of acquiring a result of detection from the sensor; a temperature increasing process of increasing a temperature of the exhaust emission controller when traveling of the vehicle stops; and a limiting process of limiting an amount of heat generated per unit time from the internal combustion engine in the temperature increasing process to a smaller value when the opening/closing member is in a closed state than when the opening/closing member is in an open state.

With this configuration, the amount of heat generated per unit time from the internal combustion engine is limited to a lower value when the opening/closing member is in the closed state than when the opening/closing member is in the open state. Accordingly, in comparison with a case in which the same amount of heat is supplied regardless of the open/closed state, it is possible to prevent the temperature of components of the exhaust system or the like from increasing excessively when the opening/closing member is in the closed state.

2. In the control device for a vehicle according to 1, the limiting process may include a process of limiting the temperature of the exhaust emission controller to a lower value when the opening/closing member is in the closed state than when the opening/closing member is in the open state.

With this configuration, the temperature of the exhaust emission controller is limited to a lower value when the opening/closing member is in the closed state than when the opening/closing member is in the open state. Accordingly, even when the amount of heat discharged from the internal combustion engine decreases because the opening/closing member is in the closed state, it is possible to prevent the temperature of the components of the exhaust system or the like from increasing excessively.

3. In the control device for a vehicle according to 2, the control device may be configured to further perform an outside air temperature acquiring process of acquiring an outside air temperature, and the limiting process may include a process of limiting the temperature of the exhaust emission controller to a lower value according to the outside air temperature such that the temperature of the exhaust emission controller when the outside air temperature is high is equal to or lower than the temperature of the exhaust emission controller when the outside air temperature is low.

When the outside air temperature is high, the amount of heat discharged from the internal combustion engine is less than that when the outside air temperature is low. Therefore, with this configuration, the temperature of the exhaust emission controller is limited to a lower value according to the outside air temperature. Particularly, this limiting process includes the process of limiting the temperature of the exhaust emission controller to a lower temperature when the outside air temperature is high than when the outside air temperature is low. Accordingly, even when the outside air temperature is high, it is possible to prevent the temperature of the components of the exhaust system or the like from increasing excessively.

4. In the control device for a vehicle according to any one of 1 to 3, the temperature increasing process may be a process of intermittently increasing an amount of thermal energy supplied to an exhaust system of the internal combustion engine, and the limiting process may include a process of limiting one execution time of the process of increasing the amount of thermal energy supplied to the exhaust system to a lower value when the opening/closing member is in the closed state than when the opening/closing member is in the open state.

When the amount of thermal energy increases, the temperature of the components of the exhaust system or the like is likely to increase. Accordingly, it is conceived that the regeneration process be temporarily stopped before an allowable range is exceeded such that the temperature of the components of the exhaust system or the like remains in the allowable range. Here, since the amount of heat discharged from the internal combustion engine is less when the opening/closing member is in the closed state than when the opening/closing member is in the open state, the execution time of the regeneration process over the allowable range becomes shorter. Therefore, with this configuration, one execution time is limited to a lower value when the opening/closing member is in the closed state than when the opening/closing member is in the open state. Accordingly, even when the amount of heat discharged from the internal combustion engine decreases because the opening/closing member is in the closed state, it is possible to prevent the temperature of the components of the exhaust system or the like from increasing excessively.

5. In the control device for a vehicle according to 4, the control device may be configured to further perform an outside air temperature acquiring process of acquiring an outside air temperature, and the limiting process may include a process of limiting the execution time to a lower value according to the outside air temperature such that the execution time when the outside air temperature is high is equal to or less than the execution time when the outside air temperature is low.

When the outside air temperature is high, the amount of heat discharged from the internal combustion engine is less than that when the outside air temperature is low. Therefore, with this configuration, the execution time is limited to a lower value according to the outside air temperature. Particularly, this limiting process includes the process of limiting the execution time to a lower value when the outside air temperature is high than when the outside air temperature is low. Accordingly, even when the outside air temperature is high, it is possible to prevent the temperature of the components of the exhaust system or the like from increasing excessively.

6. According to another aspect of the disclosure, there is provided a control device for a vehicle including an internal combustion engine and a sensor that detects an open/closed state of an opening/closing member for opening/closing an opening of an accommodation compartment in which the internal combustion engine is accommodated, wherein the internal combustion engine includes an exhaust emission controller configured to clean exhaust gas, and wherein the control device is configured to perform: an opening/closing information acquiring process of acquiring a result of detection from the sensor; a temperature increasing process of increasing a temperature of the exhaust emission controller when traveling of the vehicle stops; and a limiting process of limiting one execution time in which an amount of thermal energy supplied to an exhaust system of the internal combustion engine in the temperature increasing process is increased to a lower value when the opening/closing member is in a closed state than when the opening/closing member is in an open state.

When the amount of thermal energy increases, the temperature of the components of the exhaust system or the like is likely to increase. Accordingly, it is conceived that the regeneration process be temporarily stopped before an allowable range is exceeded such that the temperature of the components of the exhaust system or the like is in the allowable range. Here, since the amount of heat discharged from the internal combustion engine is less when the opening/closing member is in the closed state than when the opening/closing member is in the open state, the execution time of the regeneration process over the allowable range becomes shorter. Therefore, with this configuration, one execution time for increasing the amount of thermal energy supplied to the exhaust system is limited to a lower value when the opening/closing member is in the closed state than when the opening/closing member is in the open state. Accordingly, even when the amount of heat discharged from the internal combustion engine decreases because the opening/closing member is in the closed state, it is possible to prevent the temperature of the components of the exhaust system or the like from increasing excessively.

7. In the control device for a vehicle according to any one of 1 to 6, the exhaust emission controller may be configured to collect particulate matter in exhaust gas discharged to the exhaust system of the internal combustion engine, the temperature increasing process may be included in a regeneration process of removing the particulate matter collected by the exhaust emission controller, and the control device may be configured to further perform: a matter amount calculating process of calculating an amount of particulate matter at the time of execution of the temperature increasing process; and an amount information notifying process of operating predetermined hardware to notify of information on the calculated amount of particulate matter at the time of execution of the temperature increasing process.

With this configuration, information on the amount of particulate matter at the time of execution of the temperature increasing process is notified of. Accordingly, a user can ascertain a progress state of the regeneration process.

8. In the control device for a vehicle according to any one of 1 to 7, the exhaust emission controller may be configured to collect particulate matter in exhaust gas discharged to the exhaust system of the internal combustion engine, the temperature increasing process may be included in a regeneration process of removing the particulate matter collected by the exhaust emission controller, and the control device may be configured to further perform: a required time calculating process of calculating a required time until the regeneration process is completed based on a value of a variable which is used to adjust the temperature of the exhaust emission controller and which is used in the temperature increasing process and the amount of particulate matter; and a time information notifying process of operating predetermined hardware to notify of information on the calculated required time at the time of execution of the regeneration process.

With this configuration, information on the required time until the regeneration process is completed is notified of. Accordingly, a user can ascertain a progress state of the regeneration process.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

First Embodiment

Figure 1:
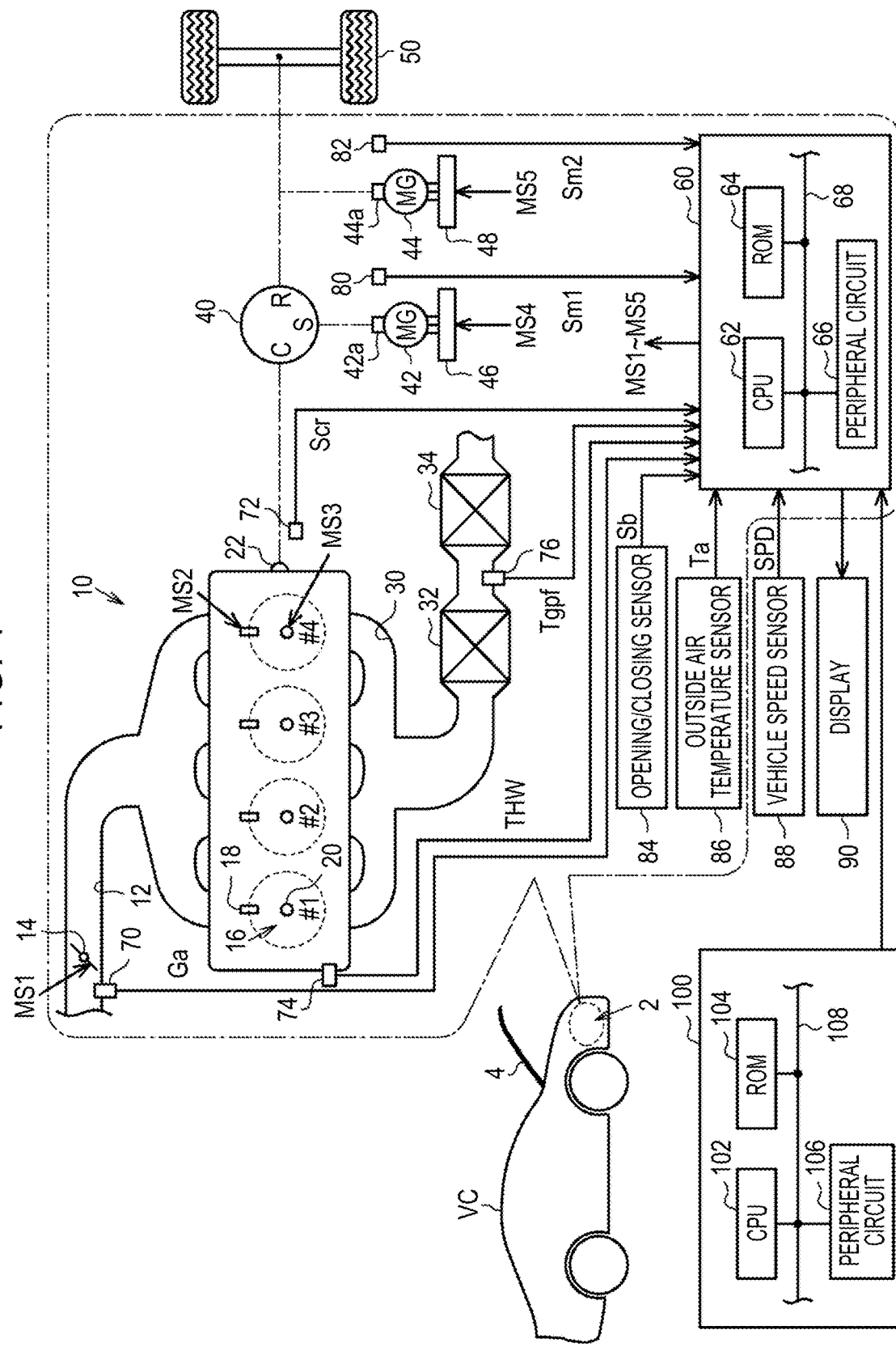
FIG. 1 is a diagram illustrating a configuration of a drive system a control device for a vehicle and a dealer terminal according to a first embodiment.

Hereinafter, a first embodiment will be described with reference to the accompanying drawings. An accommodation compartment 2 of a vehicle VC illustrated in FIG. 1 has a configuration in which an upper opening thereof can be opened/closed by an opening/closing member 4. An internal combustion engine 10 is accommodated in the accommodation compartment 2.

A throttle valve 14 is provided in an intake air passage 12 of the internal combustion engine 10. Air supplied from the intake air passage 12 flows into a combustion chamber 16. Fuel is injected into the combustion chamber 16 by a fuel injection valve 18. An air-fuel mixture of fuel and air in the combustion chamber 16 is provided for combustion with spark discharge of an ignitor 20. Combustion energy generated at this time is converted to energy of a crank shaft 22. The air-fuel mixture provided for combustion is discharged as exhaust gas to an exhaust gas passage 30. A three-way catalyst 32 having an oxygen storage capacity and a gasoline particulate filter (GPF) 34 are provided in the exhaust gas passage 30. In the GPF 34, a three-way catalyst is carried by a filter for collecting particulate matter (PM).

The crank shaft 22 is mechanically connected to a carrier C of a planetary gear mechanism 40 constituting a power split device. A rotation shaft 42a of a first motor generator 42 is mechanically connected to a sun gear S of the planetary gear mechanism 40. A rotation shaft 44a of a second motor generator 44 and driving wheels 50 are mechanically connected to a ring gear R of the planetary gear mechanism 40. An AC voltage is applied to terminals of the first motor generator 42 by a first inverter 46. An AC voltage is applied to terminals of the second motor generator 44 by a second inverter 48.

A control device 60 operates operation units of the internal combustion engine 10 such as the throttle valve 14, the fuel injection valve 18, and the ignitor 20 to control a torque, an exhaust component proportion, and the like which are control values of the internal combustion engine 10 to be controlled. The control device 60 operates the first inverter 46 to control a torque which is a control value of the first motor generator 42 to be controlled. The control device 60 operates the second inverter 48 to control a torque which is a control value of the second motor generator 44 to be controlled. In FIG. 1, operation signals MS1 to MS5 for the throttle valve 14, the fuel injection valve 18, the ignitor 20, the first inverter 46, and the second inverter 48 are illustrated. The control device 60 controls the control values of the internal combustion engine 10 with reference to an amount of intake air Ga detected by an air flowmeter 70 and an output signal Scr from a crank angle sensor 72. The control device 60 also performs the control with reference to a coolant temperature THW detected by a coolant temperature sensor 74 and a temperature Tgpf of the GPF 34 detected by a temperature sensor 76. The control device 60 controls the control value of the first motor generator 42 with reference to an output signal Sm1 from a first rotation angle sensor 80 that detects a rotation angle of the first motor generator 42. The control device 60 controls the control value of the second motor generator 44 with reference to an output signal Sm2 from a second rotation angle sensor 82 that detects a rotation angle of the second motor generator 44. The control device 60 also performs the control with reference to an output signal Sb from an opening/closing sensor 84 that detects an open/closed state of an opening/closing member 4 and an outside air temperature Ta detected by an outside air temperature sensor 86. The control device 60 also performs the control with reference to a vehicle speed SPD detected by a vehicle speed sensor 88.

The control device 60 includes a CPU 62, a ROM 64, and a peripheral circuit 66, which are communicatively connected to each other via a communication line 68. Here, the peripheral circuit 66 includes a circuit that generates a clock signal for defining an internal operation, a power supply circuit, and a reset circuit. The control device 60 controls the control values by causing the CPU 62 to execute programs stored in the ROM 64.

A routine of processes associated with a regeneration request for the GPF 34, a routine of processes associated with forcible regeneration of the GPF 34, and a routine of processes associated with setting of control variables of a forcible regeneration process out of processes performed by the control device 60 will be described below.

Routine of Processes Associated With Regeneration Request for GPF 34

Figure 2:
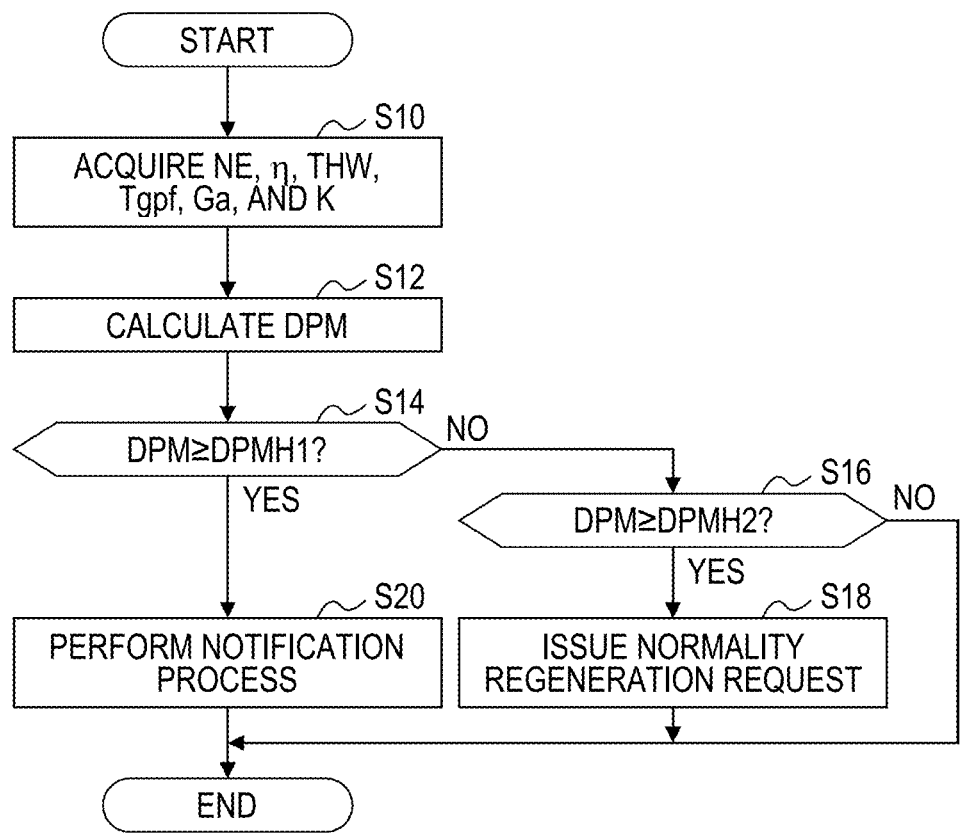
FIG. 2 is a flowchart illustrating a routine of processes which are performed by the control device according to the first embodiment.

FIG. 2 illustrates a routine of a process associated with a regeneration request for the GPF 34. The routine illustrated in FIG. 2 is realized, for example, by causing the CPU 62 to repeatedly execute a program stored in the ROM 64 at intervals of a predetermined cycle. In the following description, step numbers of the processes are denoted by numerals prefixed with "S."

In the routine of processes illustrated in FIG. 2, first, the CPU 62 acquires a rotation speed NE, a filling factor η, a coolant temperature THW, a temperature Tgpf, an amount of intake air Ga, and an increase coefficient K (S10). The rotation speed NE is a rotation speed of the crank shaft 22. The rotation speed NE is calculated based on the output signal Scr by the CPU 62. The filling factor η is calculated based on the rotation speed NE and the amount of intake air Ga by the CPU 62. The increase coefficient K is a value greater than "1" when the regeneration process for the GPF 34 is performed and is equal to "1" when the regeneration process is not performed.

Then, the CPU 62 calculates an amount of deposited PM DPM based on a value of a variable acquired in the process of S10 (S12). Here, the amount of deposited PM DPM is an amount of PM collected by the GPF 34. Specifically, the CPU 62 calculates an amount of PM in exhaust gas discharged to the exhaust gas passage 30 based on the rotation speed NE, the charging factor η, and the coolant temperature THW. The CPU 62 calculates an update value ΔDPM of the amount of deposited PM DPM based on the amount of PM in exhaust gas and the temperature Tgpf of the GPF 34. When the process of S36 which will be described later is performed, the update value ΔDPM can be calculated based on the increase coefficient K and the amount of intake air Ga.

Then, the CPU 62 updates the amount of deposited PM DPM by adding the update value ΔDPM to the amount of deposited PM DPM.

Then, the CPU 62 determines whether the amount of deposited PM DPM is equal to or greater than a forcible regeneration request value DPMH1 (S14). The forcible regeneration request value DPMH1 is set to a value at which the amount of PM collected by the GPF 34 is excessively great and the PM needs to be forcibly removed in a repair shop. When it is determined that the amount of deposited PM DPM is less than the forcible regeneration request value DPMH1 (S14: NO), the CPU 62 determines whether the amount of deposited PM DPM is equal to or greater than a normal regeneration request value DPMH2 (S16). The normal regeneration request value DPMH2 is set to a value at which the regeneration process needs to be performed when the amount of PM collected by the GPF 34 increases and a regeneration request is satisfied while the vehicle VC is traveling. The normal regeneration request value DPMH2 is less than the forcible regeneration request value DPMH1.

When it is determined that the amount of deposited PM DPM is equal to or greater than the normal regeneration request value DPMH2 (S16: YES), the CPU 62 issues a normality regeneration request (S18). On the other hand, when it is determined the amount of deposited PM DPM is equal to or greater than the forcible regeneration request value DPMH1 (S14: YES), the CPU 62 performs a notification process by operating a display 90 illustrated in FIG. 1 (S20). Information for prompting a driver to drive the vehicle VC to a repair shop along with visual information indicating that the amount of deposited PM DPM is excessively large is displayed on the display 90.

When the processes of S18 and S20 have been completed and when the determination result of S16 is negative, the CPU 62 temporarily ends the routine of processes illustrated in FIG. 2.

Routine of Processes Associated With Forcible Regeneration of GPF 34

Figure 3:
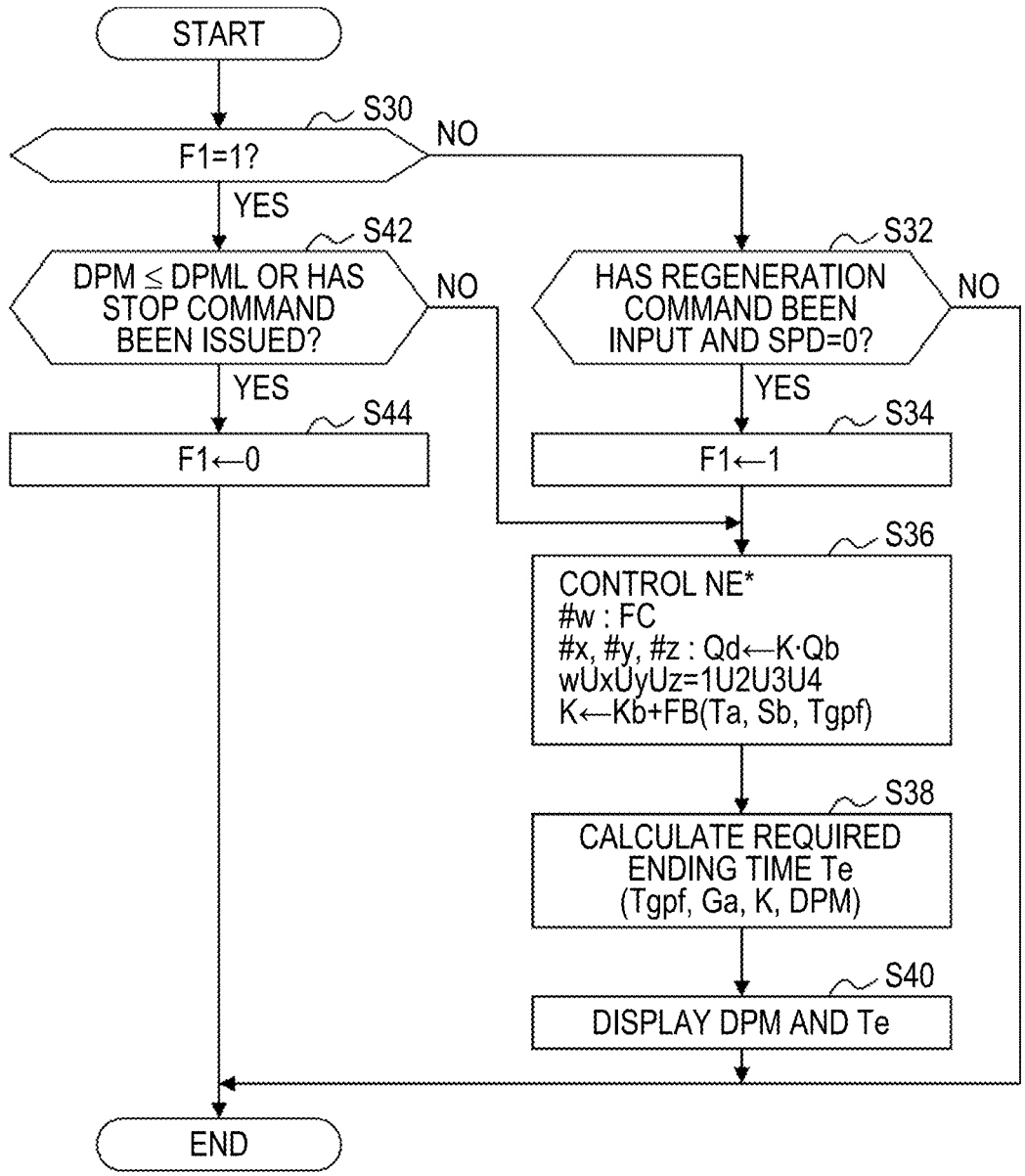
FIG. 3 is a flowchart illustrating a routine of processes which are performed by the control device according to the first embodiment.

FIG. 3 illustrates a routine of processes associated with forcible regeneration of the GPF 34. The routine of processes illustrated in FIG. 3 is realized, for example, by causing the CPU 62 to repeatedly execute a program stored in the ROM 64 at intervals of a predetermined cycle.

In the routine of processes illustrated in FIG. 3, first, the CPU 62 determines whether an execution flag F1 is "1" (S30). The execution flag F1 denotes that the regeneration process is being performed when the execution flag F1 is "1," and denotes otherwise when the execution flag F1 is "0." When it is determined that the execution flag F1 is "0" (S30: NO), the CPU 62 determines whether a logical product of Condition (A) and Condition (B) is true (S32).

Condition (A): A regeneration command for the GPF 34 is input via a shop-side terminal 100. This is a condition that is satisfied when a user drives the vehicle VC to a repair shop in the process of S20 in FIG. 2 and the shop-side terminal 100 is connected to the control device 60 as illustrated in FIG. 1.

As illustrated in FIG. 1, the shop-side terminal 100 includes a CPU 102, a ROM 104, a peripheral circuit 106, and a communication line 108. The CPU 102, the ROM 104, and the peripheral circuit 106 are communicatively connected to each other via the communication line 108.

Condition (B): The vehicle speed SPD is zero. When it is determined that the logical product is true (S32: YES), the CPU 62 substitutes "1" into the execution flag F1 (S34).

Then, the CPU 62 performs a regeneration process (S36). That is, the CPU 62 stops injection of fuel from one fuel injection valve 18 in Cylinders #1 to #4. The CPU 62 sets an air-fuel ratio of an air-fuel mixture in the combustion chambers 16 of the remaining cylinders to be richer than a stoichiometric air-fuel ratio. This process is a process of discharging oxygen and unburned fuel to the exhaust gas passage 30 and increasing the temperature of the GPF 34 to remove PM collected by the GPF 34 by combustion. That is, by discharging oxygen and unburned fuel to the exhaust gas passage 30, the unburned fuel in the three-way catalyst 32 or like is burned to increase the temperature of exhaust gas. Accordingly, it is possible to increase the temperature of the GPF. By supplying oxygen to the GPF 34, it is possible to remove PM collected by the GPF 34 by combustion.

The CPU 62 periodically switches the cylinder to which injection of fuel is stopped. The period of switching is, for example, a predetermined number times one combustion cycle. Here, the predetermined number may be, for example, 100 or greater.

The CPU 62 sets a required amount of injected fuel Qd for the remaining cylinders to a value obtained by multiplying a base amount of injected fuel Qb by an increase coefficient K such that the air-fuel ratio of an air-fuel mixture in the combustion chambers 16 of the remaining cylinders is richer than the stoichiometric air-fuel ratio. The base amount of injected fuel Qb is an amount of injected fuel required for the air-fuel ratio of the air-fuel mixture to be set to the stoichiometric air-fuel ratio. The CPU 62 sets the increase coefficient K to a value obtained by adding a feedback correction value FB to an increasing base value Kb which will be described later. The feedback correction value FB is set to a value at which the temperature Tgpf does not increase excessively. The CPU 62 calculates the feedback correction value FB based on the outside air temperature Ta, the output signal Sb, and the temperature Tgpf. The reason the outside air temperature Ta and the output signal Sb are used as inputs will be described later.

In the regeneration process, the CPU 62 feedback-controls the rotation speed NE of the crank shaft 22 to a target rotation speed NE* by controlling the rotation speed of the rotation shaft 42a of the first motor generator 42. In addition, the torque required for the internal combustion engine 10 in the regeneration process is determined by various requests in the vehicle VC. Accordingly, the torque required for the internal combustion engine 10 is not temporarily determined in the regeneration process. As a result, the filling factor η of the internal combustion engine 10 changes in the regeneration process.

Then, the CPU 62 calculates a required ending time Te of the regeneration process based on the temperature Tgpf of the GPF 34, the amount of intake air Ga, the increase coefficient K, and the amount of deposited PM DPM (S38). The CPU 62 calculates the required ending time Te to be a smaller value when the temperature Tgpf is high than when the temperature Tgpf is low. This is for taking it into consideration that a combustion rate of PM increases as the temperature Tgpf increases. The CPU 62 calculates the required ending time Te to be a larger value when the amount of deposited PM DPM is large than when the amount of deposited PM DPM is small. The CPU 62 calculates the required ending time Te to a smaller value when the amount of intake air Ga is large than when the amount of intake air Ga is small.

Then, the CPU 62 displays information indicating the amount of deposited PM DPM and the required ending time Te by operating the display 90 illustrated in FIG. 1 (S40). On the other hand, when it is determined that the execution flag F1 is "1" (S30: YES), the CPU 62 determines whether a logical sum of Condition (C) and Condition (D) is true (S42).

Condition (C): The amount of deposited PM DPM is equal to or less than an ending determination value DPML. The ending determination value DPML is set according to the amount of deposited PM DPM when the regeneration process for the GPF 34 has been sufficiently performed. The ending determination value DPML is less than the normal regeneration request value DPMH2.

Condition (D): A stop command is input from the shop-side terminal 100. This is a condition based on the premise that the regeneration process is stopped in the middle according to a user's circumstances or the like.

When it is determined that the logical sum is false (S42: NO), the CPU 62 cause the routine to proceed to S36. On the other hand, when it is determined that the logical sum is true (S42: YES), the CPU 62 ends the regeneration process by substituting "0" into the execution flag F1 (S44). When the processes of S40 and S44 are completed and when the determination result of S32 is negative, the CPU 62 temporarily ends the routine of processes illustrated in FIG. 3.

Figure 4:
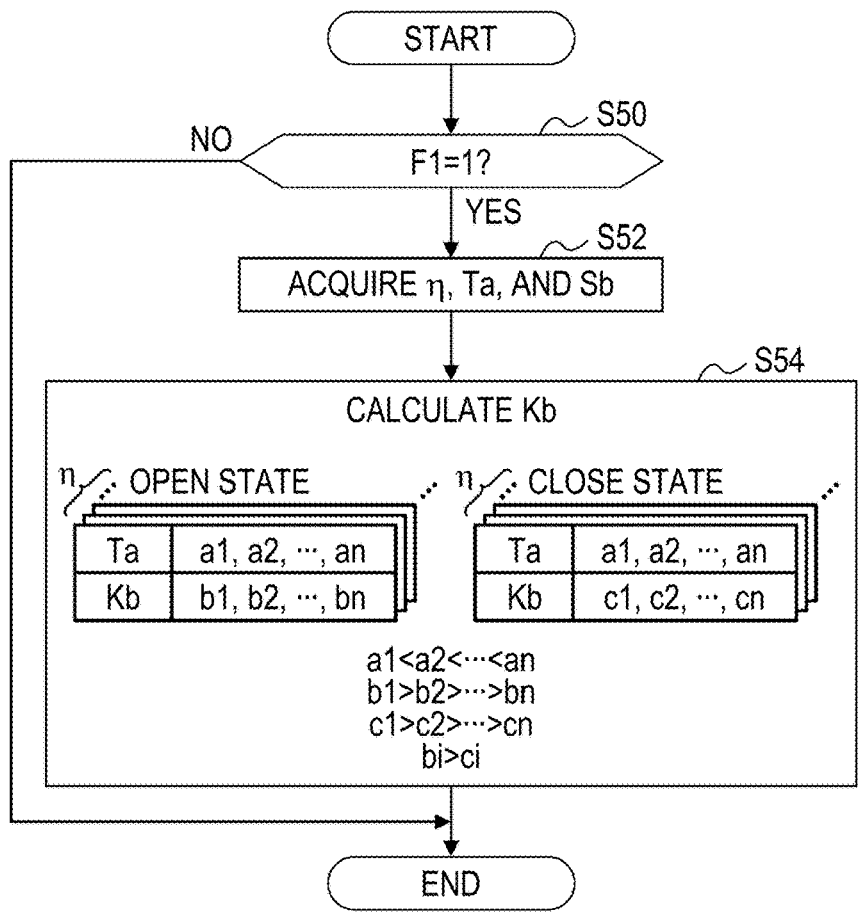
FIG. 4 is a flowchart illustrating a routine of processes which are performed by the control device according to the first embodiment.

Routine of Processes Associated With Setting of Control Variable in Forcible Regeneration Process FIG. 4 illustrates a routine of processes associated with setting a control variable in the forcible regeneration process. The routine of processes illustrated in FIG. 4 is realized, for example, by causing the CPU 62 to repeatedly execute a program stored in the ROM 64 at intervals of a predetermined cycle.

In the routine of processes illustrated in FIG. 4, first, the CPU 62 determines whether the execution flag F1 is "1" (S50). When it is determined that the execution flag F1 is "1" (S50: YES), the CPU 62 acquires the filling factor η, the outside air temperature Ta, and the output signal Sb (S52). Then, the CPU 62 calculates an increasing base value Kb (S54). The CPU 62 calculates the increasing base value Kb to be a larger value when the opening/closing member 4 is in the open state than when the opening/closing member 4 is in the closed state. This is for taking it into consideration that an amount of heat discharged from the internal combustion engine 10 is greater when the opening/closing member 4 is in the open state than when the opening/closing member 4 is in the closed state.

That is, in the regeneration process, PM is removed by oxidation by increasing the temperature of the GPF 34. The GPF 34 is designed to endure the temperature at that time. However, there may be a component of the exhaust system of which an allowable temperature is lower than that of the GPF 34. Accordingly, an upper limit of the temperature of the GPF 34 needs to be provided such that the components of the exhaust system are in the corresponding allowable temperature ranges. Here, even when the temperature Tgpf of the GPF 34 is a temperature at which an oxidation reaction of PM is caused, a time required for the regeneration process is longer when the temperature Tgpf is low than when the temperature Tgpf is high. Accordingly, in order to complete the regeneration process early, it is preferable to set the temperature of the GPF 34 to be higher.

Here, the amount of heat discharged from the internal combustion engine 10 is larger when the opening/closing member 4 is in the open state than when the opening/closing member 4 is in the closed state. Accordingly, although the temperature Tgpf of the GPF 34 is higher when the opening/closing member 4 is in the open state than when the opening/closing member 4 is in the closed state, the temperatures of other components of the exhaust system are low. Accordingly, the increasing base value Kb is set to a larger value when the opening/closing member 4 is in the open state than when the opening/closing member 4 is in the closed state such that suitable compromise between early completion of the regeneration process and curbing of the temperature increase of the components of the exhaust system is achieved.

The CPU 62 calculates the increasing base value Kb to be a larger value when the outside air temperature Ta is low than when the outside air temperature Ta is high. This is for taking it into consideration that the amount of heat discharged from the internal combustion engine 10 is larger when the outside air temperature Ta is low than when the outside air temperature Ta is high.

Figure 5:
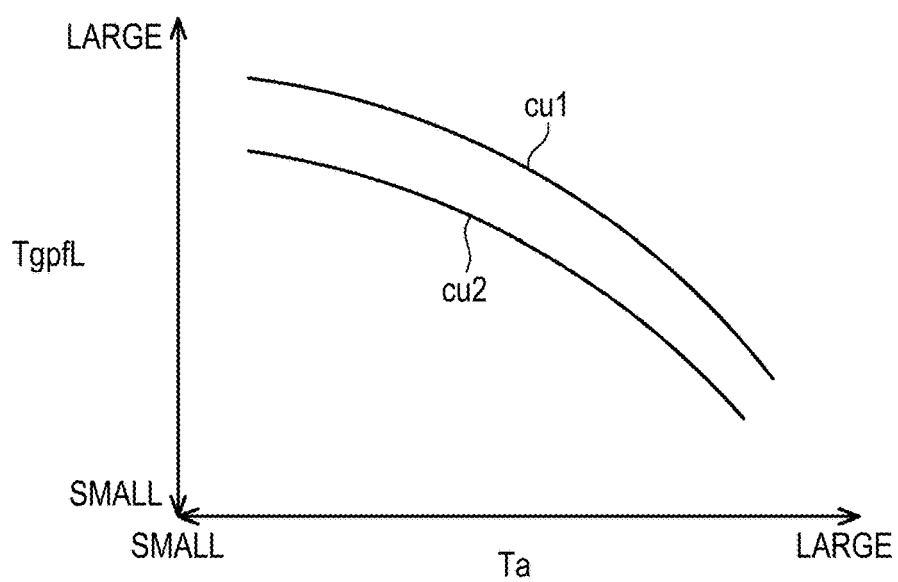
FIG. 5 is a diagram illustrating a relationship between an upper-limit temperature of a GPF and an outside air temperature according to the first embodiment.

FIG. 5 illustrates an upper limit TgpfL of the temperature Tgpf of the GPF 34 at which the components of the exhaust system are in the allowable temperature range. In FIG. 5, a curve cu1 denotes the upper limit TgpfL when the opening/closing member 4 is in the open state. A curve cu2 denotes the upper limit TgpfL when the opening/closing member 4 is in the closed state. As illustrated in FIG. 5, the upper limit TgpfL when the opening/closing member 4 is in the open state is larger than the upper limit TgpfL when the opening/closing member 4 is in the closed state. The upper limit TgpfL is set to a larger value when the outside air temperature Ta is low than when the outside air temperature Ta is high.

In this embodiment, values which are slightly smaller than the curves cu1 and cu2 in FIG. 5 are set as a target temperature of the GPF 34 when the opening/closing member 4 is in the open state and when the opening/closing member 4 is in the closed state. In this embodiment, the target temperature is not included in calculation parameters which are handled in the regeneration process by the CPU 62. Instead, the increasing base value Kb is adaptively used as an open-loop operation amount for the target temperature. The target temperature in this embodiment varies depending on the open/closed state of the opening/closing member 4 and the outside air temperature Ta. Accordingly, the CPU 62 calculates the feedback correction value FB using the output signal Sb and the outside air temperature Ta in addition to the temperature Tgpf as inputs such that the target temperature is excessively exceeded. Here, the output signal Sb and the outside air temperature Ta serve as variables for ascertaining the target temperature.

The process of S54 in FIG. 4 is a process of performing map calculation based on map data stored in the ROM 64, which is performed by the CPU 62. Here, the map data includes dedicated data when the opening/closing member 4 is in the open state and dedicated data when the opening/closing member 4 is in the closed state. These map data are data with the outside air temperature Ta and the filling factor η as input variables and with the increasing base value Kb as an output variable. In FIG. 4, it is illustrated that the output variable bi when the opening/closing member 4 is in the open state is larger than the output variable ci when the opening/closing member 4 is in the closed state as for the same outside air temperature Ta. Here, "i=1, 2, 3, . . . " is defined. "ai" denotes the value of the outside air temperature Ta which is the input variable. "bi" and "ci" denote the values of the increasing base value Kb which is the output variable. In FIG. 4, the values of the outside air temperature Ta are described to be "a1, a2, a3, . . . , an" in the ascending order. It is also illustrated that relationships "b1>b2> . . .

>bn" and "c1>c2> . . . >cn" are satisfied by "bi" and "ci" which are the corresponding values of the increasing base value Kb.

Map data is group data including a discrete value of an input variable and a value of an output variable corresponding to the value of the input variable. Map calculation may be a process of setting the corresponding value of the output variable of the map data as a result of calculation when a value of an input variable matches one of the values of the input variable in the map data. The map calculation may be a process of setting a value obtained by interpolating the values of a plurality of output variables included in the map data as a result of calculation when a value of an input variable does not correspond to any value of the input variable of the map data.

When the process of S54 is completed and when the determination result of S50 is negative, the CPU 62 temporarily ends the routine of processes illustrated in FIG. 4. When a normality regeneration request is issued in the process of S18, the CPU 62 performs the same as the process of S36 when the vehicle VC is traveling. In this case, the target rotation speed NE* is set to be variable according to a traveling state of the vehicle VC. The increasing base value Kb is larger than the value set in the process of S54 when the opening/closing member 4 is in the open state.

Operations and advantages of this embodiment will be described below. The CPU 62 sequentially calculates the amount of deposited PM DPM in the GPF 34. When the amount of deposited PM DPM is equal to or greater than the normal regeneration request value DPMH2, the CPU 62 issues a normal regeneration request. Accordingly, the regeneration process is performed based on the premise that predetermined conditions are satisfied when the vehicle VC is traveling. When it is determined that the amount of deposited PM DPM is equal to or greater than the forcible regeneration request value DPMH1 which is greater than the normal regeneration request value DPMH2, the CPU 62 notifies a user of the determination result. Accordingly, the user drives the vehicle VC to a repair shop.

When a regeneration command is input from the shop-side terminal 100 in a state in which the vehicle VC stops, the CPU 62 performs the regeneration process for the GPF 34. In the regeneration process, the temperature of the GPF 34 is controlled such that it is lower than that when the vehicle VC is traveling. The CPU 62 sets the increasing base value Kb to a smaller value when the opening/closing member 4 is in the closed state than when the opening/closing member 4 is in the open state. Accordingly, the CPU 62 performs control such that the temperature of the GPF 34 is lower when the opening/closing member 4 is in the closed state than when the opening/closing member 4 is in the open state. Accordingly, it is possible to curb an excessive increase in the temperature of the exhaust system when the amount of heat discharged from the internal combustion engine 10 is small and the temperature of the components of the exhaust system is likely to increase over an allowable temperature.

The following operations and advantages are additionally achieved according to the aforementioned embodiment.

(1) The CPU 62 sets the increasing base value Kb to a larger value when the outside air temperature Ta is low than when the outside air temperature Ta is high. The amount of heat discharged from the internal combustion engine 10 is greater when the outside air temperature Ta is low than when the outside air temperature Ta is high. Accordingly, although the temperature of the GPF 34 increases, the temperature of the components of the exhaust system increases less. As a result, in comparison with a case in which the increasing base value Kb is set to a fixed value regardless of the outside air temperature Ta, it is possible to minimize a period of time required for the regeneration process for the GPF 34 while the temperature of the components of the exhaust system is maintained in the allowable range.

(2) The CPU 62 calculates the increasing base value Kb based on the filling factor'q. The temperature of the exhaust system is determined based on an operating point of the internal combustion engine 10 in addition to the increase coefficient K. Here, the operating point is determined based on the rotation speed NE and a load. Accordingly, by calculating the increasing base value Kb based on the filling factor $\eta$ which is a variable indicating the load, the increasing base value Kb can be used as an open-loop operation amount which is accurate for the temperature of the GPF 34 to reach a target temperature.

(3) The CPU 62 displays information on the amount of deposited PM DPM on the display 90 while performing the regeneration process. Accordingly, a user can ascertain a progress state of the regeneration process.

(4) The CPU 62 displays the required ending time Te of the regeneration process on the display 90. Accordingly, a user can ascertain a period of time required until the regeneration process ends. As a result, for example, the user can easily determine whether to stop the regeneration process as scheduled.

Second Embodiment

A second embodiment will be described below with a focus on a difference from the first embodiment with reference to the accompanying drawings.

Figure 6:
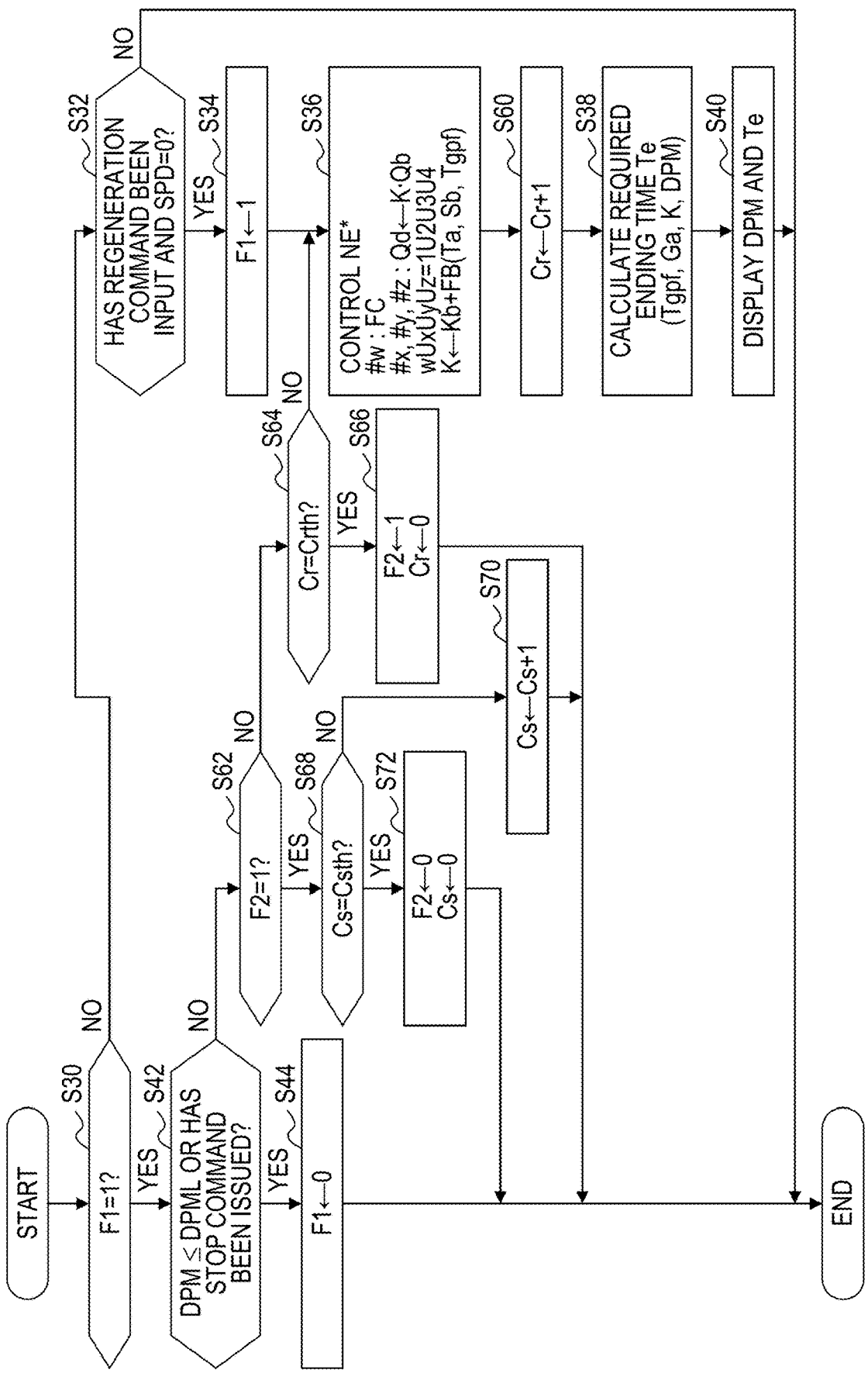
FIG. 6 is a flowchart illustrating a routine of processes which are performed by a control device according to a second embodiment.

In this embodiment, an increase in temperature of the exhaust system is curbed by intermittently performing a regeneration process. FIG. 6 illustrates a routine of processes associated with regeneration of the GPF 34. The routine of processes illustrated in FIG. 6 is realized, for example, by causing the CPU 62 to repeatedly perform a program stored in the ROM 64 at intervals of a predetermined cycle. In FIG. 6, the same process steps as in the routine of processes illustrated in FIG. 3 are referred to by the same step numbers for the purpose of convenience.

In the routine of processes illustrated in FIG. 6, when the process of S36 is performed, the CPU 62 increments an execution period counter Cr (S60). The execution period counter Cr is a counter for counting an execution period of one regeneration process which is intermittently performed. When the process of S60 is completed, the CPU 62 causes the routine to proceed to the process of S38.

On the other hand, when the determination result of S42 is negative, the CPU 62 determines whether a stop flag F2 is "1" (S62). The stop flag F2 indicates that the regeneration process is temporarily stopped when it is "1," and indicates that the regeneration process is not stopped when it is "0." At a time point at which the process of S34 is performed, the stop flag F2 is set to "0."

When it is determined that the stop flag F2 is "0" (S62: NO), the CPU 62 determines whether the execution period counter Cr matches an execution duration time Crth (S64). When it is determined that the execution period counter Cr is less than the execution duration time Crth (S64: NO), the CPU 62 causes the routine to proceed to the process of S36. On the other hand, when it is determined that the execution period counter Cr matches the execution duration time Crth (S64: YES), the CPU 62 substitutes "1" into the stop flag F2 and initializes the execution period counter Cr (S66).

On the other hand, when it is determined that the stop flag F2 is "1" (S62: YES), the CPU 62 determines that a stop period counter Cs matches a stop duration time Csth (S68). The stop period counter Cs is a counter that counts a duration time of a state in which the regeneration process is temporarily stopped when the execution flag F1 is "1." The stop duration time Csth is set to a time in which the regeneration process is temporarily stopped when the execution flag F1 is "1."

When it is determined that the stop period counter Cs is less than the stop duration time Csth (S68: NO), the CPU 62 increments the stop period counter Cs (S70). On the other hand, when it is determined that the stop period counter Cs matches the stop duration time Csth (S68: YES), the CPU 62 substitutes "0" into the stop flag F2 and initializes the stop period counter Cs (S72).

Figure 7:
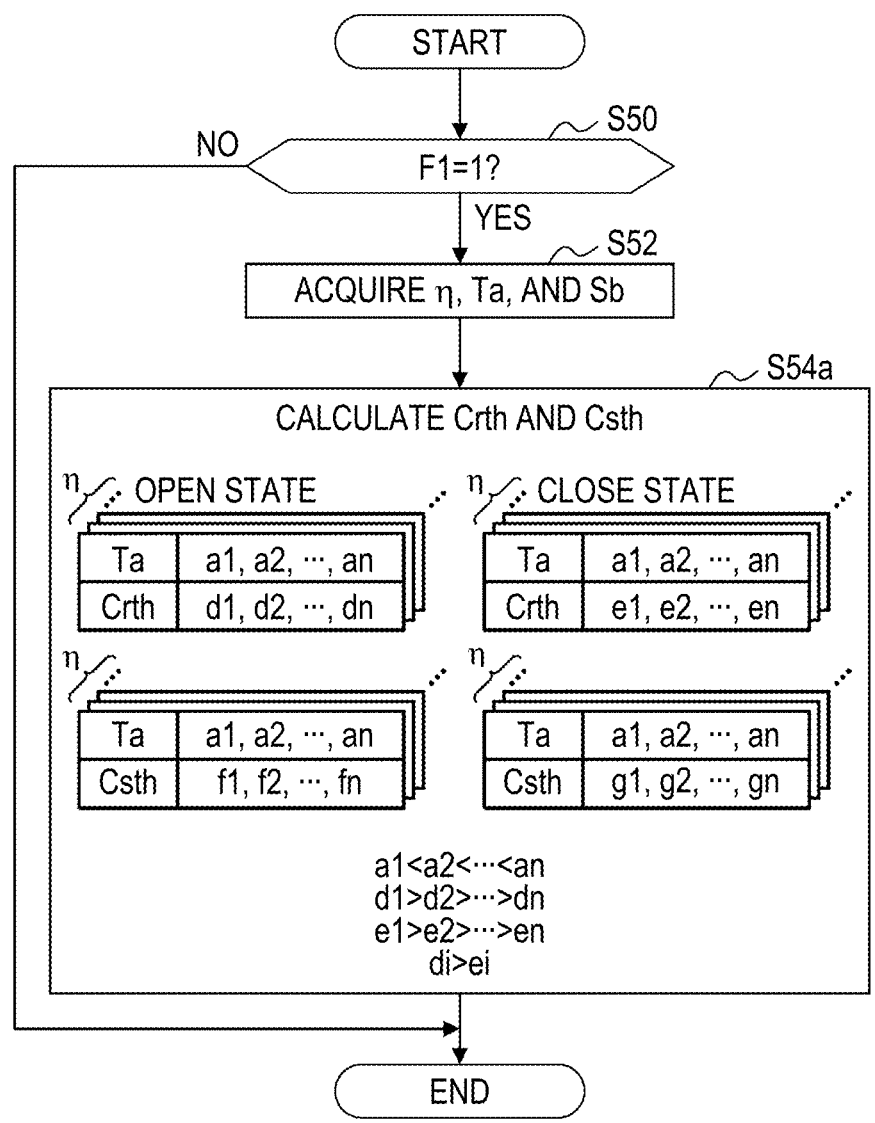
FIG. 7 is a flowchart illustrating a routine of processes which are performed by the control device according to the second embodiment.

When the processes of S66, S70, and S72 are completed, the CPU 62 temporarily ends the routine of processes illustrated in FIG. 6. FIG. 7 illustrates a routine of processes associated with setting of a control variable of the forcible regeneration process. The routine of processes illustrated in FIG. 7 is realized, for example, by causing the CPU 62 to repeatedly execute a program stored in the ROM 64 at intervals of a predetermined cycle. In FIG. 7, the same process steps as in the routine of processes illustrated in FIG. 4 are referred to by the same step numbers for the purpose of convenience.

In the routine of processes illustrated in FIG. 7, when the process of S52 is completed, the CPU 62 calculates the execution duration time Crth and the stop duration time Csth using the open/closed state of the opening/closing member 4, the outside air temperature Ta, and the filling factor η as inputs (S54a). Here, the CPU 62 calculates the execution duration time Crth when the opening/closing member 4 is in the open state as a larger value than the execution duration time Crth when the opening/closing member 4 is in the closed state. This is because the amount of heat discharged from the internal combustion engine 10 is larger when the opening/closing member 4 is in the open state than when the opening/closing member 4 is in the closed state and thus a continuous execution time of the regeneration process in which the temperature of the exhaust system may increase excessively is elongated. The CPU 62 calculates the execution duration time Crth when the outside air temperature Ta is low as a larger value than the execution duration time Crth when the outside air temperature Ta is high. This is because the amount of heat discharged from the internal combustion engine 10 is larger when the outside air temperature Ta is low than when the outside air temperature Ta is high and thus the continuous execution time of the regeneration process in which the temperature of the exhaust system may increase excessively is elongated.

Specifically, the process of S54a is a process of map-calculating the execution duration time Crth and the stop duration time Csth using map data stored in the ROM 64, which is performed by the CPU 62. The map data includes four pieces of map data. Two pieces thereof are data with the outside air temperature Ta and the filling factor η as input variables and with the execution duration time Crth as an output variable. One of the two pieces is dedicated data when the opening/closing member 4 is in the open state, and the other thereof is dedicated data when the opening/closing member 4 is in the closed state. The remaining two pieces are data with the outside air temperature Ta and the filling factor η as input variables and with the stop duration time Csth as an output variable. One of the remaining two pieces is dedicated data when the opening/closing member 4 is in the open state, and the other thereof is dedicated data when the opening/closing member 4 is in the closed state.

In FIG. 7, a relationship between an output variable di indicating the value of the execution duration time Crth when the opening/closing member 4 is in the open state and an output variable ei indicating the value of the execution duration time Crth when the opening/closing member 4 is in the closed state is illustrated. In FIG. 4, it is illustrated that there are relationships "d1>d2> . . . >dn" and "e1>e2> . . . >en" between the output variables di and ei indicating the values of the execution duration time Crth according to the value ai of the outside air temperature Ta. In FIG. 4, an output variable fi indicating the value of the stop duration time Csth when the opening/closing member 4 is in the open state and an output variable gi indicating the value of the stop duration time Csth when the opening/closing member 4 is in the closed state are illustrated.

When the process of S54a is completed, the CPU 62 temporarily ends the routine of processes illustrated in FIG. 7. In this embodiment, the increasing base value Kb is set to the same value when the opening/closing member 4 is in the open state and when the opening/closing member 4 is in the closed state. That is, it is assumed that the target temperature of the GPF 34 in the regeneration process is controlled such that it is set to the same temperature when the opening/closing member 4 is in the open state and when the opening/closing member 4 is in the closed state.

In this way, in this embodiment, the execution duration time Crth and the stop duration time Csth are set based on the open/closed state of the opening/closing member 4. Particularly, the CPU 62 calculates the execution duration time Crth when the opening/closing member 4 is in the open state as a larger value than the execution duration time Crth when the opening/closing member 4 is in the closed state. Accordingly, it is possible to curb an increase in temperature of the components of the exhaust system over the allowable range.

Third Embodiment

A third embodiment will be described below with a focus on a difference from the first embodiment with reference to the accompanying drawings.

Figure 8:
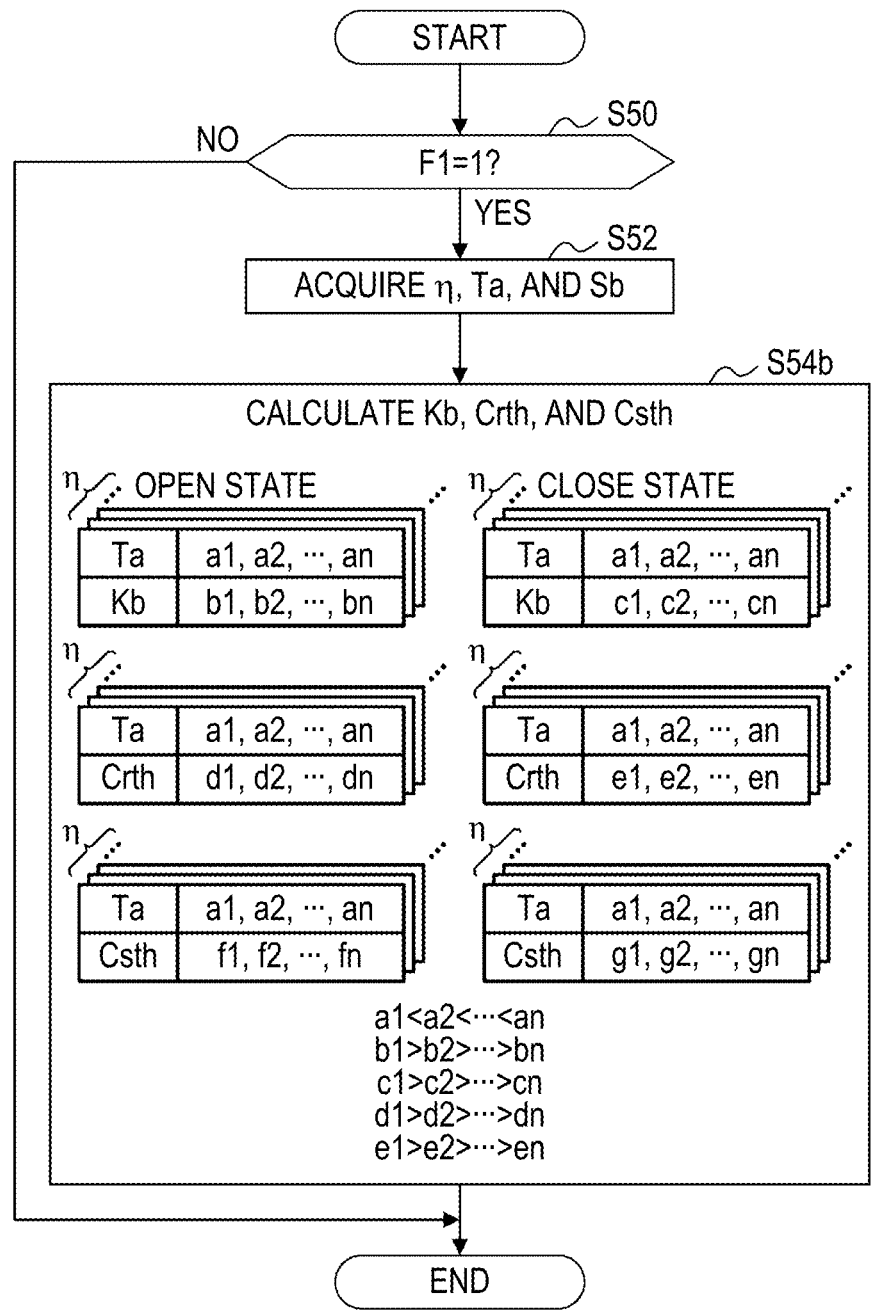
FIG. 8 is a flowchart illustrating a routine of processes which are performed by a control device according to a third embodiment.

FIG. 8 illustrates a routine of processes associated with setting of a control variable in a forcible regeneration process. The routine of processes illustrated in FIG. 8 is realized, for example, by causing the CPU 62 to repeatedly perform a program stored in the ROM 64 at intervals of a predetermined cycle. In FIG. 8, the same process steps as in the routine of processes illustrated in FIG. 7 are referred to by the same step numbers for the purpose of convenience.

In the routine of processes illustrated in FIG. 8, when the process of S52 is completed, the CPU 62 calculates the increasing base value Kb, the execution duration time Crth, and the stop duration time Csth using the open/closed state of the opening/closing member 4, the outside air temperature Ta, and the filling factor η as inputs (S54b). This process includes the process of S54 and the process of S54a. In this embodiment, the target temperature of the GPF 34 when the opening/closing member 4 is in the open state and the target temperature of the GPF 34 when the opening/closing member 4 is in the closed state do not match. Accordingly, the execution duration time Crth when the opening/closing member 4 is in the open state does not need to be set to a larger value than the execution duration time Crth when the opening/closing member 4 is in the closed state. When the process of S54*b* is completed, the CPU 62 temporarily ends the routine of processes illustrated in FIG. 8.

Correspondence

Correspondence between the elements described in the embodiments and the elements described in the "SUMMARY" is as follows. The correspondence is described below for each configuration described in the "SUMMARY." [1] The exhaust emission controller corresponds to the GPF 34. The opening/closing information acquiring process corresponds to the process of S52. The temperature increasing process corresponds to the process of S36. The limiting process corresponds to the processes of S54, S54*a*, and S54*b*. The process of limiting an amount of heat to a lower value corresponds to the process of limiting the increasing base value Kb to a lower value. [2] The process of limiting the temperature to a lower value corresponds to the process of limiting the increasing base value Kb to a lower value. This is based on knowledge that the increasing base value Kb is the open-loop operation amount assumed to be required for causing the temperature of the GPF 34 to reach the target temperature. [3] The outside air temperature acquiring process corresponds to the process of S52. [4] This process corresponds to the process of performing the regeneration process in only a period with the length of the execution duration time Crth and then stopping the regeneration process in a period with the length of the stop duration time Csth. [5] This process corresponds to the process of determining the execution duration time Crth according to the outside air temperature Ta. [7] The matter amount calculating process corresponds to the process of S12. The amount information notifying process corresponds to the process of S40. [8] The required time calculating process corresponds to the process of S38. The time information notifying process corresponds to the process of S40.

Other Embodiments

The embodiments may be modified as follows. The embodiments and the following modified examples can be combined with each other unless technical conflictions arise.

Limiting Process (a) Intermittent Increasing Process

FIG. 7 illustrates that the output variables in the map data have a relationship "d1>d2> . . . >dn," but the disclosure is not limited thereto. For example, some output variables may be set to the same such as "d2=d3" in a relationship between "d2" and d3."

FIG. 7 illustrates that the output variables in the map data have a relationship "e1>e2> . . . en," but the disclosure is not limited thereto. For example, some output variables may be set to the same such as "e2=e3" in a relationship between "e2" and e3."

In the routine of processes illustrated in FIG. 7, both the execution duration time Crth and the stop duration time Csth are set to be variable depending on whether the opening/closing member 4 is in the open state or in the closed state. The execution duration time Crth is set to a larger value when the opening/closing member 4 is in the open state than when the opening/closing member 4 is in the closed state. However, instead, for example, the stop duration time Csth may be set to a larger value when the opening/closing member 4 is in the closed state than when the opening/closing member 4 is in the open state. Accordingly, a heat discharging period due to stopping of the regeneration process can be set to be longer when the opening/closing member 4 is in the closed state than when the opening/closing member 4 is in the open state.

Both the execution duration time Crth and the stop duration time Csth do not need to be set to be variable depending on whether the opening/closing member 4 is in the open state or in the closed state. For example, only the execution duration time Crth may be set to be variable depending on whether the opening/closing member 4 is in the open state or in the closed state. For example, only the stop duration time Csth may be set to be variable depending on whether the opening/closing member 4 is in the open state or in the closed state.

The input variables used to calculate the execution duration time Crth are not limited to the variable indicating the open/closed state, the outside air temperature Ta, and the filling factor η which is a variable indicating a load. For example, the base amount of injected fuel Qb may be used as the variable indicating the load. For example, when the target rotation speed NE* in the regeneration process can have a plurality of values, the rotation speed may be included in the input variables.

The input variables used to calculate the execution duration time Crth are not limited to three variables including the variables indicating the open state, the outside air temperature Ta, and a load. For example, the input variables may include only the variable indicating the open state.

The input variables used to calculate the stop duration time Csth are not limited to the variable indicating the open/closed state, the outside air temperature Ta, and the filling factor η which is a variable indicating a load. For example, the base amount of injected fuel Qb may be used as the variable indicating the load. For example, when the target rotation speed NE* in the regeneration process can have a plurality of values, the rotation speed may be included in the input variables.

The input variables used to calculate the stop duration time Csth are not limited to three variables including the variables indicating the open/closed state, the outside air temperature Ta, and a load. For example, the input variables may include only the variable indicating the open/closed state.

(b) Increasing Base Value Kb

FIG. 4 illustrates that the output variables in the map data have a relationship "b1>b2> . . . >bn," but the disclosure is not limited thereto. For example, some output variables may be set to the same such as "b2=b3" in a relationship between "b2" and b3."

FIG. 4 illustrates that the output variables in the map data have a relationship "c1>c2> . . . cn," but the disclosure is not limited thereto. For example, some output variables may be set to the same such as "c2=c3" in a relationship between "c2" and c3."

In the aforementioned embodiments, two pieces of data including data indicating that the opening/closing member 4 is in the open state and data indicating that the opening/closing member 4 is in the closed state are used as the map data with the increasing base value Kb as an output variable, but the disclosure is not limited thereto. For example, map data used to calculate the increasing base value Kb when the opening/closing member 4 is in the closed state and map data used to map-calculate the correction value for correcting the increasing base value Kb such that it increases may be used. The increasing correction is performed when the opening/closing member 4 is in the open state.

The input variables used to calculate the increasing base value Kb are not limited to the variable indicating the open/closed state, the outside air temperature Ta, and the filling factor η which is a variable indicating a load. For example, the base amount of injected fuel Qb may be used as the variable indicating the load. For example, when the target rotation speed NE* in the regeneration process can have a plurality of values, the rotation speed may be included in the input variables.

The input variables used to calculate the increasing base value Kb are not limited to three variables including the variables indicating the open/closed state, the outside air temperature Ta, and a load. For example, the input variables may include only the variable indicating the open/closed state.

The process of calculating the increasing base value Kb is not limited to the process using the variable indicating the open/closed state, the variable indicating a load, and the rotation speed NE as inputs. For example, the target temperature of the GPF 34 may be included in the input variable. In this case, the target temperature can be set to a larger value when the opening/closing member 4 is in the open state than when the opening/closing member 4 is in the closed state. The target temperature may be set to a larger value when the outside air temperature Ta is low than when the outside air temperature Ta is high.

Outside Air Temperature Ta

In the aforementioned embodiments, the outside air temperature sensor 86 is provided in the accommodation compartment 2, but the disclosure is not limited thereto. For example, a sensor that detects an intake air temperature of the internal combustion engine 10 may be used instead of the sensor that detects the outside air temperature.

Amount Information Notifying Process

In the aforementioned embodiments, visual information on the amount of deposited PM DPM is displayed on the display 90 mounted in the vehicle, but the disclosure is not limited thereto. For example, the visual information may be displayed on a display device provided in a repair shop. For example, the visual information may be displayed on a mobile terminal of an operator or a mobile terminal of a user. In this case, a communicator may be provided in the control device 60, and the amount information notifying process performed by the CPU 62 may be a process of outputting visual information by operating the communicator.

In the aforementioned embodiment, the amount of deposited PM DPM is sequentially calculated and is displayed on the display 90, but the disclosure is not limited thereto. For example, the amount of deposited PM DPM may be displayed only when a request has been issued. In the aforementioned embodiment, the amount of deposited PM DPM is notified of as visual information, but the disclosure is not limited thereto. For example, the amount of deposited PM DPM may be notified of as auditory information.

Time Information Calculating Process

The variables used to calculate the required ending time Te are not limited to those exemplified in the aforementioned embodiments. For example, when the rotation speed NE is controlled such that it becomes a predetermined value as in the embodiments, the filling factor η may be used instead of the amount of intake air Ga. For example, a detection value from an air-fuel ratio sensor provided upstream from the GPF 34 may be used as the increase coefficient.

Time Information Notifying Process

In the aforementioned embodiments, visual information on the required ending time Te is displayed on the display 90 mounted in the vehicle, but the disclosure is not limited thereto. For example, the visual information may be displayed on a display device provided in a repair shop/seller office. For example, the visual information may be displayed on a mobile terminal of an operator or a mobile terminal of a user. In this case, a communicator may be provided in the control device 60, and the time information notifying process performed by the CPU 62 may be a process of outputting visual information by operating the communicator.

In the aforementioned embodiment, the required ending time Te is sequentially calculated and is displayed on the display 90, but the disclosure is not limited thereto. For example, the required ending time Te may be displayed only when a request has been issued. In the aforementioned embodiment, the required ending time Te is notified of as visual information, but the disclosure is not limited thereto. For example, the required ending time Te may be notified of as auditory information.

Execution Conditions of Temperature Increasing Process

The inputting of a regeneration command which is included in the execution conditions of the temperature increasing process is not limited to inputting of a regeneration command from a shop-side terminal 100 in a state in which the shop-side terminal 100 is connected to the control device 60. For example, a combination of predetermined operations of members which are operated by a user in the vehicle VC may be used as the inputting of a regeneration command In this case, the combination is set as a combination which is not caused in a normal operation.

A condition that the shift position is the parking position may be included in the execution conditions of the temperature increasing process instead of including a condition that the vehicle speed is zero. Both the condition that the vehicle speed is zero and the condition that the shift position is the parking position may be included.

Temperature Increasing Process

A cylinder to which supply of fuel is stopped does not have to be periodically changed. The number of cylinders to which supply of fuel is stopped does not have to be one.

For example, the number of cylinders may be two. When the number of cylinders in the internal combustion engine is eight which is large, the number of cylinders to which supply of fuel is stopped may be three or more.

The method of increasing the temperature of the GPF 34 is not limited to the process of stopping supply of fuel to some cylinders and setting an air-fuel ratio of a mixed gas in the remaining cylinders to be richer than a stoichiometric air-fuel ratio. For example, the method may include control for increasing the exhaust gas temperature by delaying an ignition timing, or the like to decrease combustion efficiency. For example, the method may include a dither control process of setting an air-fuel ratio of air-fuel mixture in some cylinders to be leaner than the stoichiometric air-fuel ratio and setting an air-fuel ratio of air-fuel mixture in the remaining cylinders to be richer than the stoichiometric air-fuel ratio.

Control Device

The control device is not limited to a configuration including the CPU 62 and the ROM 64 to perform software processes. For example, the control device may include a dedicated hardware circuit such as an ASIC of performing at least some of the software processes performed in the aforementioned embodiments by hardware. That is, the control device may have any of the following configurations (a) to (c): (a) a configuration including a processing device that performs all the processes in accordance with a program and a program storage device such as a ROM that stores the program; (b) a configuration including a processing device that performs some of the processes in accordance with a program, a program storage device, and a dedicated hardware circuit that performs the other processes; and (c) a configuration including a dedicated hardware circuit that performs all the processes. Here, the number of software execution devices including a processing device and a program storage device or the number of dedicated hardware circuits may be two or more.

What is claimed is:

1. A control device for a vehicle including an internal combustion engine and a sensor that detects an open/closed state of an opening/closing member for opening/closing an opening of an accommodation compartment in which the internal combustion engine is accommodated,
wherein the internal combustion engine includes an exhaust emission controller configured to clean exhaust gas, and
wherein the control device comprises:
a processor and a non-transitory computer readable medium including instructions which, when executed by the processor, cause the processor to perform:
an opening/closing information acquiring process of acquiring a result of detection from the sensor;
a temperature increasing process of increasing a temperature of the exhaust emission controller in response to that (i) traveling of the vehicle stops and (ii) an input of a regeneration command for the exhaust emission controller is received from an external terminal; and
a limiting process of limiting an amount of heat generated per unit time from the internal combustion engine in the temperature increasing process to a smaller value when the opening/closing member is in the closed state than when the opening/closing member is in the open state.

2. The control device according to claim 1, wherein the limiting process includes a process of limiting the temperature of the exhaust emission controller to a lower value when the opening/closing member is in the closed state than when the opening/closing member is in the open state.

3. The control device according to claim 2, wherein the instructions, when executed by the processor, cause the processor to further perform an outside air temperature acquiring process of acquiring an outside air temperature, and
wherein the limiting process includes a process of limiting the temperature of the exhaust emission controller to the lower value according to the outside air temperature such that the temperature of the exhaust emission controller when the outside air temperature is high is equal to or lower than the temperature of the exhaust emission controller when the outside air temperature is low.

4. The control device according to claim 2, wherein the instructions, when executed by the processor, cause the processor to further perform an outside air temperature acquiring process of acquiring an outside air temperature, and
wherein the limiting process includes a process of limiting the temperature of the exhaust emission controller to the lower value according to the outside air temperature such that the temperature of the exhaust emission controller when the outside air temperature is high is lower than the temperature of the exhaust emission controller when the outside air temperature is low.

5. The control device according to claim 1, wherein the temperature increasing process is a process of intermittently increasing an amount of thermal energy supplied to an exhaust system of the internal combustion engine, and
wherein the limiting process includes a process of limiting an execution time of the process of increasing the amount of thermal energy supplied to the exhaust system to a lower value when the opening/closing member is in the closed state than when the opening/closing member is in the open state.

6. The control device according to claim 5, wherein the instructions, when executed by the processor, cause the processor to further perform an outside air temperature acquiring process of acquiring an outside air temperature, and
wherein the limiting process includes a process of limiting the execution time to the lower value according to the outside air temperature such that the execution time when the outside air temperature is high is equal to or less than the execution time when the outside air temperature is low.

7. The control device according to claim 5, wherein the instructions, when executed by the processor, cause the processor to further perform an outside air temperature acquiring process of acquiring an outside air temperature, and
wherein the limiting process includes a process of limiting the execution time to the lower value according to the outside air temperature such that the execution time when the outside air temperature is high is less than the execution time when the outside air temperature is low.

8. The control device according to claim 1, wherein the exhaust emission controller is configured to collect particulate matter in exhaust gas discharged to an exhaust system of the internal combustion engine,
wherein the temperature increasing process is included in a regeneration process of removing the particulate matter collected by the exhaust emission controller, and
wherein the instructions, when executed by the processor, cause the processor to further perform:
a matter amount calculating process of calculating an amount of particulate matter at the time of execution of the temperature increasing process; and
an amount information notifying process of operating predetermined hardware to notify of information on the calculated amount of particulate matter at the time of execution of the temperature increasing process.

9. The control device according to claim 1, wherein the exhaust emission controller is configured to collect particulate matter in exhaust gas discharged to an exhaust system of the internal combustion engine, wherein the temperature increasing process is included in a regeneration process of removing the particulate matter collected by the exhaust emission controller, and wherein the instructions, when executed by the processor, cause the processor to further perform:
- a required time calculating process of calculating a required time until the regeneration process is completed based on a value of a variable which is used to adjust the temperature of the exhaust emission controller and which is used in the temperature increasing process and the amount of particulate matter; and
- a time information notifying process of operating predetermined hardware to notify of information on the calculated required time at the time of execution of the regeneration process.

10. The control device according to claim 1, wherein the limiting process includes:
   in response to determining the opening/closing member being in the open state, setting a first increasing base value by which the amount of heat generated per unit time from the internal combustion engine in the temperature increasing process is increased, and
   in response to determining the opening/closing member being in the closed state, setting a second increasing base value that is smaller than the first increasing base value.

11. A control device for a vehicle including an internal combustion engine and a sensor that detects an open/closed state of an opening/closing member for opening/closing an opening of an accommodation compartment in which the internal combustion engine is accommodated, wherein the internal combustion engine includes an exhaust emission controller configured to clean exhaust gas, and wherein the control device comprises:
   a processor and a non-transitory computer readable medium including instructions which, when executed by the processor, cause the processor to perform:
   an opening/closing information acquiring process of acquiring a result of detection from the sensor;
   a temperature increasing process of increasing a temperature of the exhaust emission controller in response to that (i) traveling of the vehicle stops and (ii) an input of a regeneration command for the exhaust emission controller is received from an external terminal; and
   a limiting process of limiting one execution time in which an amount of thermal energy supplied to an exhaust system of the internal combustion engine in the temperature increasing process is increased to a lower value when the opening/closing member is in the closed state than when the opening/closing member is in the open state.

* * * * *